Patented Apr. 29, 1941

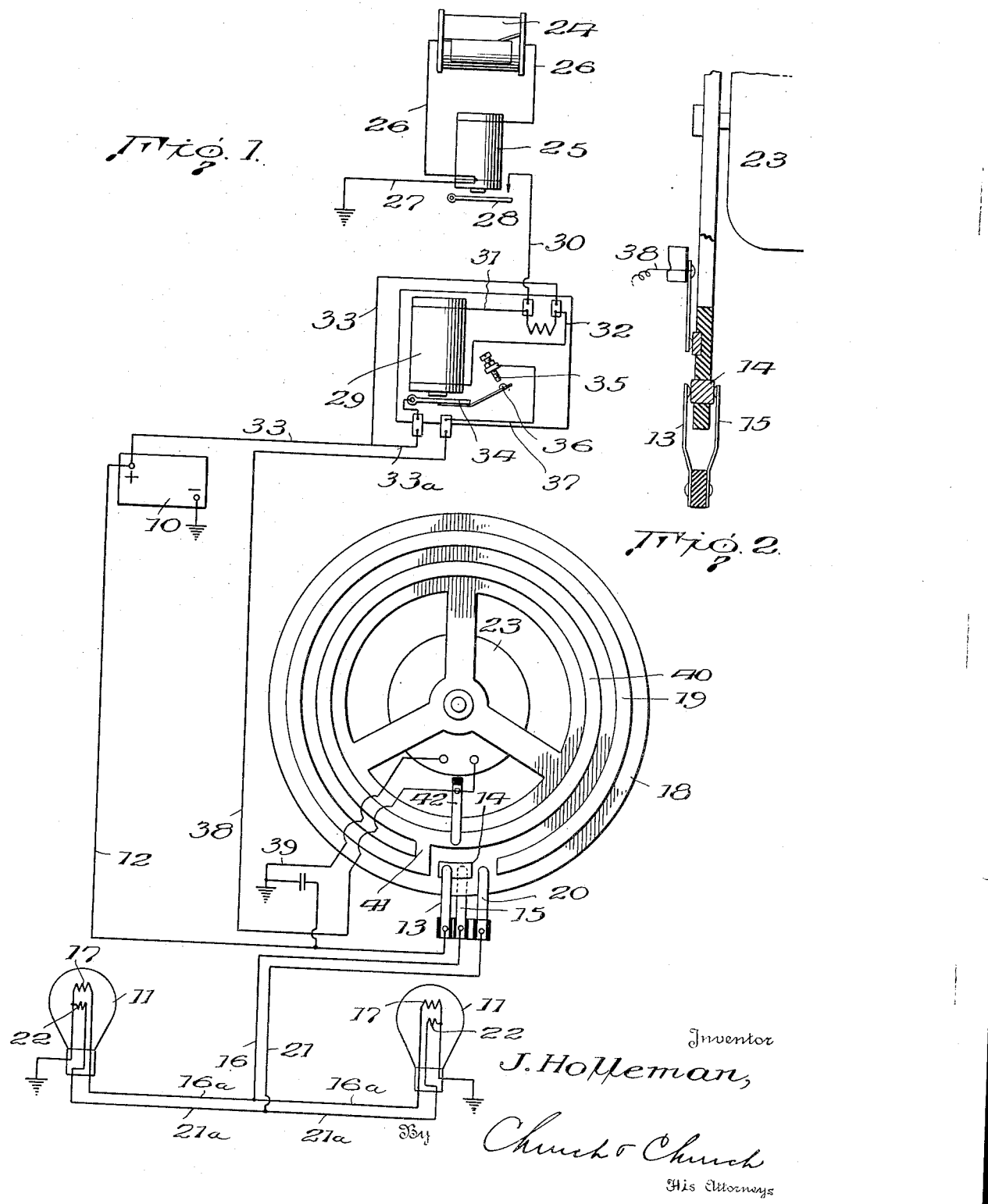

2,240,397

UNITED STATES PATENT OFFICE 2,240,397

HEADLIGHT CONTROL MECHANISM

Joe Holleman, Eastland, Tex.

Application March 27, 1939, Serial No. 264,437

4 Claims. (Cl. 171—97)

This invention relates to improvements in control mechanisms for vehicle headlights.

One object of the invention is to provide a headlight control mechanism which is primarily operated by means responsive to the intensity of illumination in the path of the vehicle, in the sense that, upon the approach of an oncoming vehicle, the bright lights of the vehicle equipped with the present invention will be rendered inoperative and the dim lights energized automatically.

Another object of the invention is to provide a headlight control mechanism of the type indicated, wherein flickering of the lights is impossible.

A still further object of the invention is to provide a control mechanism for vehicle headlights wherein the dim lights, after being energized in lieu of the bright lights, will remain energized over a period of time sufficient to allow the approaching vehicle to pass.

A still further object is to provide a vehicle headlight control mechanism wherein the light circuits are established through a contact supporting member provided with a contact plate which is normally engaged by contact members for energizing the bright lights and also with substantially circular concentric contact strips by means of which the dim lights will be energized over an extended period of time, and also by means of which a motor, for rotating said support, will be energized. The motor is initially energized by a light-sensitive means responsive to lights of an approaching vehicle, but by having the previously described auxiliary circuit through one of the circular contact members, the dim lights are certain to be illuminated for the extended period of time notwithstanding the possibility of the circuit initially established through the light-sensitive means being prematurely disrupted or broken.

With these and other objects in view, the invention consists in certain details of construction and combinations and arrangements of parts, all as will hereinafter be more fully described, and the novel features thereof particularly pointed out in the appended claims.

In the accompanying drawing illustrating the preferred embodiment of the present invention—

Figure 1 is a more or less diagrammatical illustration of the control mechanism; and Fig. 2 is a transverse sectional view illustrating the construction of the rotatable contact support.

In accordance with customary practice, the battery 10, which is the source of current for the lights 11, is grounded, as are also said lights and, under normal night-driving conditions, when the bright lights are in use, current flows through light 12 to a contact finger 13 which, under these conditions, is in engagement with a comparatively short contact plate 14, and which plate is also engaged by another contact finger 15 from which a line 16, having branches 16ª, leads to the filaments 17 for the bright lights. This contact plate 14 extends through a rotatably mounted support 18, the contact fingers 13 and 15 being disposed at opposite sides of the support, as shown in Fig. 2. Upon the approach of an oncoming vehicle, safety dictates that the bright lights should be extinguished and dimmer lights illuminated and, for this purpose, the rotatable support 18 is provided with an elongated contact member 19 preferably substantially circularly arranged on the support, with the contact plate 14 disposed on the support between the ends of said contact 19. By rotating the support 18, said contact member is adapted to engage not only the contact finger 13, but a third contact finger 20 from which a line 21, having branches 21ª, leads to the filaments 22 for the dim lights. Hence, so long as the support 18 remains stationary with fingers 13 and 15 in contact with plate 14, the bright lights will be illuminated, but upon support 18 being rotated, contact 14 moves out of engagement with fingers 13, 15, extinguishing the bright lights, and the elongated member 19 substantially instantaneously engages contact fingers 13 and 20. It will be understood, that, upon completion of a revolution of the support, the circuit to the dim lights is broken, and the circuit to the bright lights re-established or, in other words, the parts are returned to the respective positions illustrated in Fig. 1.

To automatically control this cutting in and out of the dim and bright lights, the motor 23 for rotating the support 18 is primarily controlled through a circuit which comprises a light-sensitive cell 24 which, as is well understood, will be responsive to light rays emitted from the headlights of an oncoming vehicle. When light from an approaching vehicle impinges on cell 24, relay 25 is energized, this relay being connected to the light cell by lines 26 and to ground by line 27. Relay 25 being energized, the armature 28 thereof closes a circuit through a magnet 29, this circuit consisting of lines 30 and 31 by which the magnet is connected to ground through the relay and line 27 and lines 32, 33, by which the magnet is connected to battery 10. Thus, magnet 29 is energized and the consequent movement of its armature 34 closes contacts 35, 36, whereupon a circuit is established from the battery 10 through lines 33 and 33ª to the contacts 35, 36, and thence by lines 37, 38, to the motor 23 which is grounded through line 39. Thus, the motor is placed in operation with the result that contacts 13, 15, become disengaged from contact plate 14 and contacts 13 and 20 engage the circular contact strip 19. As previously described, this will result in the bright lights being cut off and the dim lights energized.

Also mounted on the rotatable support 18 is an inner concentric contact ring 40, which is connected to the circular contact member 19 as, for instance, by a cross strip 41 and, engageable with this inner contact ring 40 is a contact finger 42, which is connected to one side of the motor through line 38. As a result, when contact fingers 13 and 20 move into engagement with contact ring 19, current will flow from the battery 10 through line 12 to contact finger 13 to contact ring 19 and from the latter through cross member 41 to the inner ring 40 and thence by way of contact finger 42 and line 38 to the motor which, as before stated, is grounded through line 39. As a result, a complete rotation of the support 18 is insured, regardless of whether or not magnet 29 remains energized. In other words, this last-described circuit is an auxiliary circuit for maintaining an operating circuit through the motor until the support 18 has made a complete revolution.

The arrangement of the several contact fingers engaging the contact rings on support 18 is such as to eliminate all flickering of the lights and, due to the fact that support 18 makes a complete revolution when once the motor is energized, comparatively long contact strips such as strip 19 can be used and thus maintain a circuit through the dim light filaments for a rather extended period of time or, at least, sufficient time for the approaching vehicle, which first energizes the relay, to pass the vehicle equipped with the present invention. It will be appreciated that the contact members 19 and 40 may take various forms but, preferably, they, together with the cross connection 41, are stamped from a sheet of material so as to constitute an integral arrangement. The important point is that these strips be of sufficient length to allow the approaching vehicles to pass before the dim lights are cut off and the bright lights restored.

What I claim is:

1. In a control mechanism for the bright and dim light circuits between a source of current and the headlights of a vehicle wherein each of said circuits comprises a fixed contact, a rotatable support, an elongated contact strip on said support engageable with the fixed contact of the dim light circuit during substantially a complete revolution of said support, a comparatively short contact member on said support normally engaging the fixed contact of the bright light circuit but disengageable therefrom by rotary motion of the support, a motor for rotating said support, and means controlling the operation of said motor comprising a source of electricity, light-sensitive means for connecting said motor with said source, and an auxiliary circuit controlled by said light-sensitive means for maintaining said motor connected to said source during a complete revolution of the support.

2. In a control mechanism for the bright and dim light circuits for the headlights of a vehicle wherein each of said circuits comprises a fixed contact, a rotatable support, an endless ring contact on said support, a motor for rotating said support, a contact member for said motor engageable with said ring contact, a second circular contact on said support having its ends spaced apart, a connection between said ring contact and circular contact, a comparatively short contact on said support intermediate the ends of the circular contact, said short contact normally engaging contact members of the bright light circuit while said support is stationary and said circular contact being adapted to engage the contact member for closing the dim light circuit when the support is rotated, a normally open circuit for the motor comprising said ring contact on the rotatable support, and light-sensitive means for closing said motor circuit to rotate said support.

3. In a control mechanism for the bright and dim light circuits for the headlights of a vehicle wherein said circuits comprise fixed contact members, a rotatable support, an endless ring contact on said support, a motor for rotating said support, a contact member for said motor engageable with said ring contact, a second circular contact on said support having its ends spaced apart but connected with said ring contact, a comparatively short contact on said support, a source of current for actuating said motor, said short contact normally engaging the contact members of the bright light circuit for maintaining said circuit closed while said support is stationary and said circular contact being engageable with the contact member of the dim light circuit for closing said circuit when the support is rotated, a normally open circuit for the motor, light-sensitive means for closing the motor circuit for rotating said support, and means comprising said circular and ring contacts for maintaining the motor operative for a complete revolution of said support.

4. In a control mechanism for the bright and dim light circuits for the headlights of a vehicle wherein said circuits comprise fixed contact members with one of said members common to the two circuits, a rotatable support, a motor for rotating said support, a source of current for said motor, a continuous contact ring on said support, means comprising a contact finger engaging said ring for energizing said motor, a discontinuous contact strip on said support concentric with and connected to said ring, a contact plate on said support intermediate the ends of said contact strip, a fixed contact member of the bright light circuit and said common contact member being engageable with said plate for energizing the bright light circuit and a contact member of the dim light circuit and said common contact member being engageable with the discontinuous strip for energizing the dim light circuit, and means comprising a light-sensitive cell for initially rendering said motor operative.

JOE HOLLEMAN.